United States Patent [19]

Zudal

[11] Patent Number: 4,901,588
[45] Date of Patent: Feb. 20, 1990

[54] ATTACHMENT FOR POWER TOOL

[76] Inventor: Andrew Zudal, 4140 Mt. Olney La., Olney, Md. 20832

[21] Appl. No.: 713,592

[22] Filed: Mar. 19, 1985

[51] Int. Cl.⁴ .................... F16H 25/12; F16H 25/16
[52] U.S. Cl. ........................................................ 74/57
[58] Field of Search ........................................... 74/57

[56] References Cited

U.S. PATENT DOCUMENTS

| | | | |
|---|---|---|---|
| 2,469,277 | 5/1949 | Schmidt | 74/57 |
| 2,474,056 | 6/1949 | Larsen | 74/57 |
| 2,548,411 | 4/1951 | Vache | 74/57 |
| 2,567,856 | 9/1951 | Polk | 74/57 |
| 3,049,803 | 8/1962 | Danger | 74/57 |
| 3,260,289 | 7/1966 | Whitten | 74/57 |
| 3,596,525 | 8/1971 | Niesz | 74/57 |
| 3,668,940 | 6/1972 | Avena et al. | 74/57 |

Primary Examiner—Leslie A. Braun
Assistant Examiner—Janice E. Chartoff
Attorney, Agent, or Firm—Larson and Taylor

[57] ABSTRACT

An attachment is provided for a high speed low torque rotary power tool for conversion to a low speed high torque reciprocating linear motion so that the power tool can be used with a reciprocating saw blade, file or cutting tools. The attachment is driven by the chuck on the output shaft of the power tool and clamps directly on the power tool housing.

3 Claims, 2 Drawing Sheets

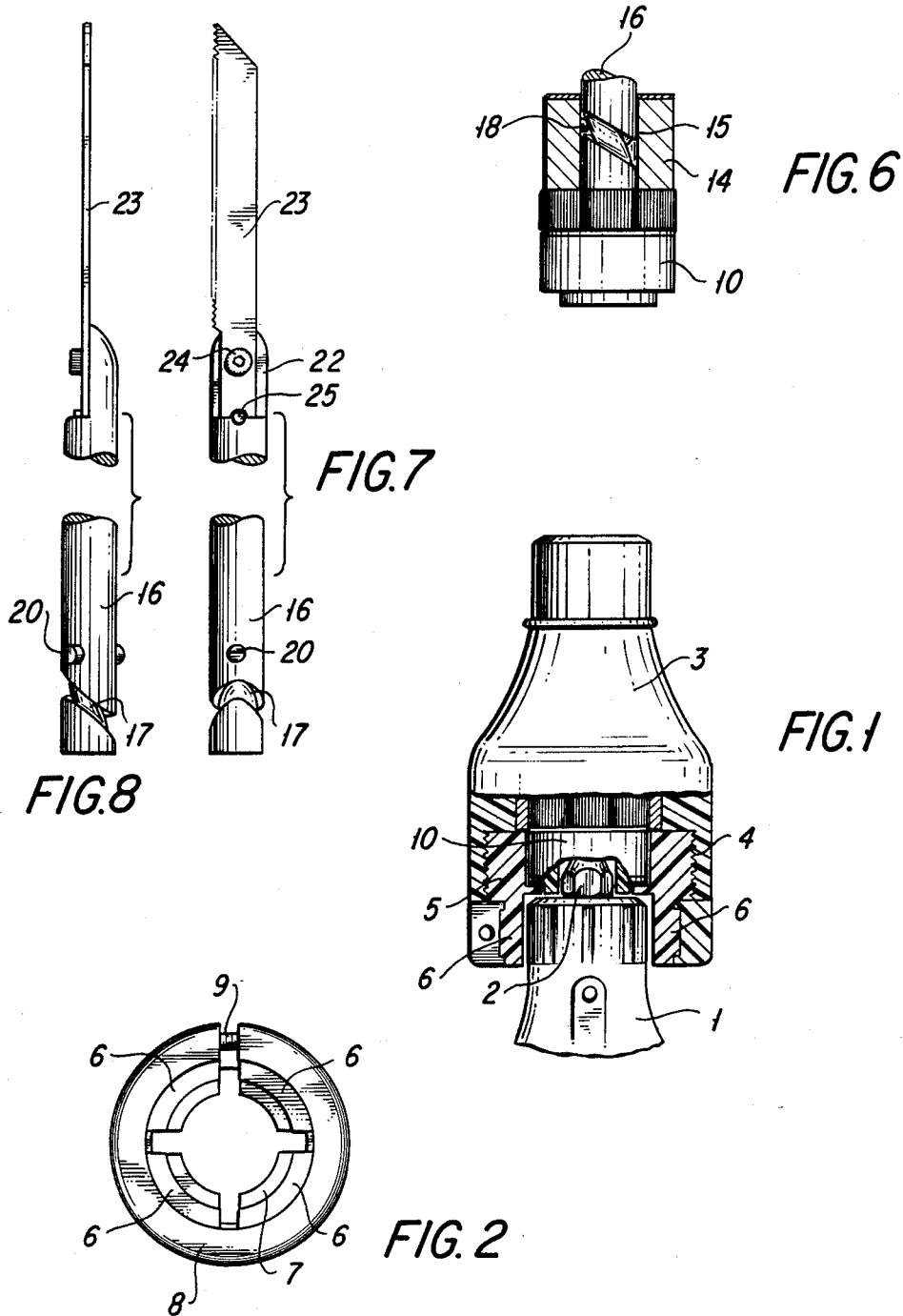

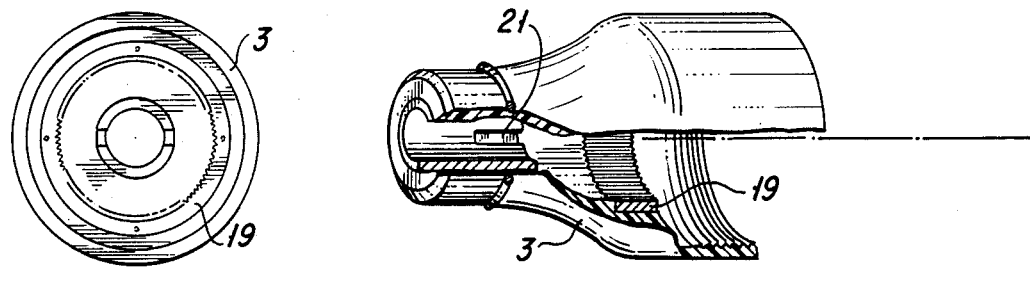
FIG. 5
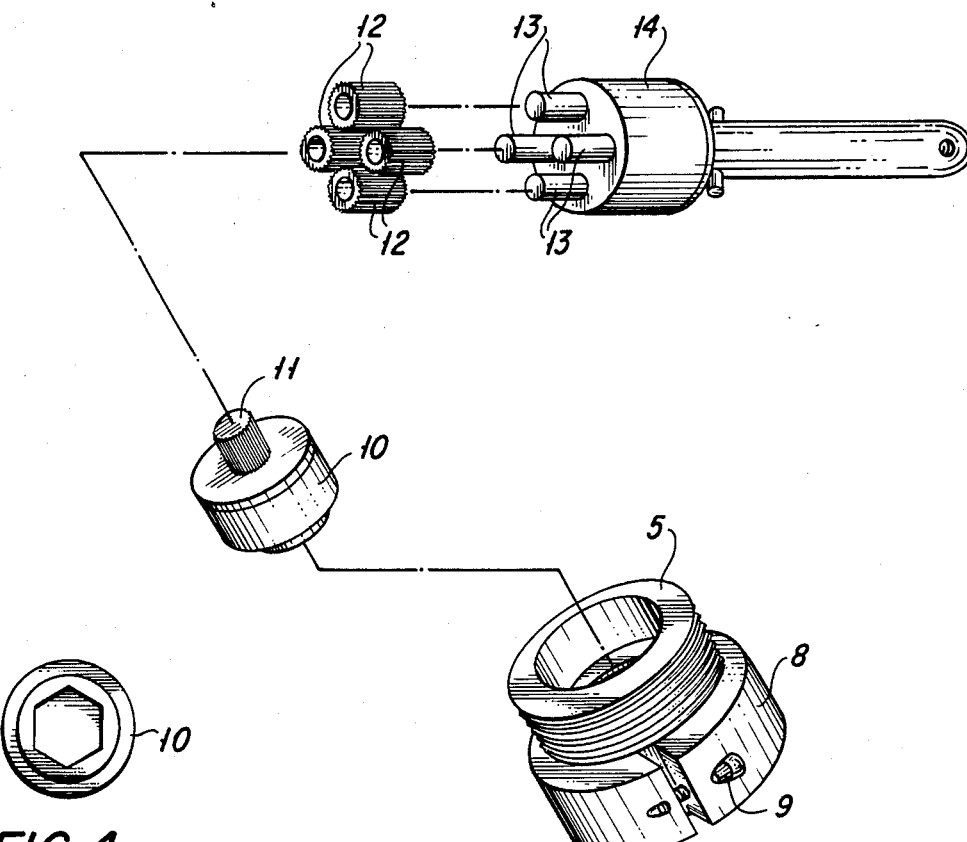
FIG. 4
FIG. 3

4,901,588

ATTACHMENT FOR POWER TOOL

BACKGROUND OF THE INVENTION

There are in the prior art numerous examples of mechanisms for converting rotary motion into reciprocating linear motion. Specifically, there have been prior art devices which may be attached to power tools for converting the rotary motion of the output shaft of the power tool into linear reciprocating motion so that the power tool can be used to operate reciprocating saws and the like. Examples of such devices are found in U.S. Pat. Nos. 1,679,884, 2,548,411 and 1,660,579. It is also well known in the prior art to convert rotary motion into linear motion for the purpose of attaching hammers to rotary drills. Such devices are shown in U.S. Pat. Nos. 2,094,185, 1,825,072 and 2,442,140.

The prior art devices do not, however, provide a simple means for clamping the conversion attachment directly to the chuck of a rotary power tool. Furthermore, the prior art devices do not teach the use of a conversion attachment in which the mechanism converts the high speed low torque rotary motion from the power tool to a low speed high torque reciprocating linear movement suitable for operating a reciprocating saw. Certain of the mechanisms utilized in the present invention including cams and gearing are shown in the prior art in U.S. Pat. Nos. 3,116,651, 3,596,525, and 704,810.

SUMMARY OF THE INVENTION

The present invention is directed to providing an attachment for hand held power tools which are primarily designed for high speed low torque applications. The attachment of the present invention provides a means for converting such power tools to adapt the tool to drive a saw blade, for example, in a reciprocating linear motion at a relatively low speed with high torque. The attachment clamps directly on the housing of the power tool with the chuck of the output shaft of the power tool providing the drive for the attachment.

The mechanism within the attachment for converting the rotary motion of the output shaft of the power tool to a reciprocating linear motion comprises a planetary gear and ring gear arrangement which converts the high speed low torque output of the rotary shaft to a low speed high torque rotary motion. The output from the planetary gear arrangement drives a cam means including an endless helical cam groove and cam follower which is mounted on the output shaft of the attachment so as to convert the rotary drive to a reciprocating linear motion.

An object of the present invention is to provide an attachment for a power tool which converts the rotary motion of the power tool to a reciprocating linear motion and also converts a high speed low torque rotary motion into a low speed high torque reciprocating linear motion.

A further object of the present invention is to provide an attachment for a hand held power tool which is operatively connected to the chuck on the output shaft of the power tool and may be clamped directly onto the power tool housing.

Other objects and many of the attendant advantages of the present invention will become apparent upon consideration of the following detailed specification when considered in connection with the accompanying drawings.

BRIEF DESCRIPTION OF THE DRAWINGS

FIG. 1 is an elevational view partly in section showing a portion of the end of a power tool and the attachment in place;

FIG. 2 is an end view of the attachment which engages the end of the power tool;

FIG. 3 is an exploded view of the operative parts of the power tool attachment;

FIG. 4 is an end view of the sleeve which engages the power tool chuck;

FIG. 5 is an end view of the housing for the attachment;

FIG. 6 is an elevational view of the power trane of the attachment;

FIG. 7 is an end elevation of the linear motion output shaft with a tool attached thereto; and FIG. 8 is a side elevation of the linear motion output shaft with a tool attached thereto.

DETAILED DESCRIPTION OF THE DRAWINGS

Referring now more specifically to the drawings wherein like numerals indicate like parts throughout the several views there is shown in FIG. 1 at 1 the end portion of a hand held power tool. This may be of any well known power tools currently available on the market such as, for example, the Dremel Moto-Tool. This tool runs at speeds up to 30,000 revolutions per minute and is a high speed low torque tool. The output shaft of the power tool is provided with an adjustable chuck 2 which is in the form of a hexagonal nut which screws down onto the rotary output shaft and engages a collet within an aperture in the chuck so that a tool may be inserted in the collet and tightened onto the rotary shaft by the chuck.

The attachment of the present invention comprises a housing 3 which may be made of a plastic material or the like and has a threaded end portion 4 to receive a threaded apertured end cap 5. The end cap 5 includes four spaced locking elements 6 as shown in FIG. 2, each of the locking elements having an inwardly extending flange 7 to retain the operating mechanism within the attachment.

Extending around the locking fingers 6 is a doughnut shaped clamping member 8 having the ends thereof spaced and held together by a screw retainer 9. It can be seen that when the attachment to the power tool is placed over the end of the power tool as shown in FIG. 1 the screw 9 can be rotated to tighten the clamping member 8 and draw the locking fingers 6 closer together in tight engagement with the outside face of the power tool housing.

Within the attachment there is provided a sleeve element 10 having an inner surface which conforms with the hexagonal configuration of the chuck 2 so that the sleeve 10 can be brought into a nonslip engagement with the chuck 2. Thus, the rotary motion of the chuck 2 will be transmitted directly to the sleeve 10 with no possibility of slippage between these elements.

As shown in FIG. 3 the sleeve 10 has fixed on an upper surface thereof a sun gear 11 which is adapted to engage planetary gears 12 freely rotatable on gear shafts 13 mounted on a gear carrier 14.

As can be seen in FIG. 6 the gear carrier 14 has a bore 15 therein into which the linear motion output shaft 16 fits. The linear motion output shaft has a continuous helix cam groove 17 as shown in FIGS. 7 and 8 and this cam groove is in engagement with a cam follower 18 which is fixedly mounted within the bore 15 of the gear carrier 14.

As shown in FIGS. 3 and 5, there is fixed within the housing 3 a ring gear 19 having teeth on the inner surface thereof which engage the teeth of the planetary gears 12. The gear train including the sun gear 11, planetary gears 12 and ring gear 19 convert the high speed low torque rotation of the output shaft from the power tool 1 to a low speed high torque rotation of the planetary gear carrier 14.

The linear motion output shaft has a pin 20 extending therethrough as shown in FIG. 8 and this pin engages in slots 21 within the housing 3 as shown in FIG. 3. The pins 20 operating within the slots 21 prevent the rotation of the output shaft 16 so that, when the planetary gear carrier 14 rotates, the cam follower 18 in engagement in the helical cam groove 17 of the output shaft 16 causes the output shaft to move in a linear reciprocating motion.

As shown in FIGS. 7 and 8 the end portion of the output shaft 16 is provided with a cutaway flattened area 22 to provide a means for attaching a tool such as a saw blade 23. The saw blade 23 is retained in position on the output shaft by means of a screw 24 passing through an opening within the blade and a pin 25 which engages a slot in the end portion of the blade 23.

It can be seen that by virtue of the present arrangement an attachment is provided for a power tool which converts the high speed low torque rotary motion of the output shaft of the power tool to a low speed high torque linear reciprocatory motion. Means is provided for clamping the attachment directly on the end of the power tool with the chuck on the output shaft of the power tool in direct nonslip engagement with a sleeve on the attachment. The gear means provides for conversion of the high speed low torque rotary motion of the output shaft 2 to a low speed high torque rotary motion of the planetary gear carrier 14. The cam follower 18 and endless helical cam groove 17 on the shaft 16 provide a means for converting the rotary motion of the gear carrier 14 to a linear reciprocating motion of the output shaft 16.

Obviously many modifications and variations of the present invention are possible in light of the above teachings. What is claimed as new and desired to be secured by Letters Patent is:

What is claimed:

1. An attachment for converting the high speed low torque rotary output of a power tool to a low speed high torque linear reciprocating motion, the power tool having an adjustable chuck on the output shaft thereof for attaching tools to the output shaft, comprising a housing having a threaded end portion, an end cap for said housing having threads on the outer periphery thereof to screw fit within said housing, a rotary sleeve in said end cap having a recess in one end thereof to fit in nonslip relationship with the external surface of the adjustable chuck, a plurality of spaced flexible locking elements on said end cap extending from one end thereof, clamping means engaging said flexible locking elements for securing said housing around the periphery of the power tool with said sleeve in locking engagement with the adjustable chuck of the power tool, a sun gear fixedly mounted on said rotary sleeve on the end thereof opposite said recess, a planetary gear carrier rotatably mounted in said housing adjacent said sleeve, a plurality of gear shafts fixed on one end of said gear carrier, a plurality of planetary gears rotatably mounted on said gear shafts and engaged with said sun gear, a ring gear fixed within said housing and having internal teeth in engagement with said planetary gears, a bore in the opposite end of said planetary gear carrier, said bore having a cam follower therein, a linear motion output shaft having an endless helical cam groove in the surface thereof in engagement with the cam follower in said planetary gear carrier, a pin extending from the surface of said linear motion output shaft engaging an elongated slot in the housing to prevent rotary motion of said linear motion output shaft and means for attaching a tool to said linear motion output shaft.

2. An attachment according to claim 1 wherein said clamping means comprises a screw retainer engaging a clamping member.

3. An attachment according to claim 1 wherein the external surface of said adjustable chuck and the internal surface of said recess are hexagonal shaped to fit in nonslip relationship.

* * * * *